(12) United States Patent
Wu et al.

(10) Patent No.: US 9,300,956 B2
(45) Date of Patent: Mar. 29, 2016

(54) METHOD AND APPARATUS FOR REDUNDANT VIDEO ENCODING

(75) Inventors: Zhenyu Wu, Plainsboro, NJ (US); Jill MacDonald Boyce, Manalapan, NJ (US)

(73) Assignee: THOMSON LICENSING, Boulogne-Billancourt (FR)

( * ) Notice: Subject to any disclaimer, the term of this patent is extended or adjusted under 35 U.S.C. 154(b) by 2167 days.

(21) Appl. No.: 12/225,909

(22) PCT Filed: Feb. 27, 2007

(86) PCT No.: PCT/US2007/005115
§ 371 (c)(1),
(2), (4) Date: Oct. 1, 2008

(87) PCT Pub. No.: WO2007/126517
PCT Pub. Date: Nov. 8, 2007

(65) Prior Publication Data
US 2009/0052543 A1 Feb. 26, 2009

Related U.S. Application Data

(60) Provisional application No. 60/793,539, filed on Apr. 20, 2006.

(51) Int. Cl.
| H04B 1/66 | (2006.01) |
|---|---|
| H04N 19/00 | (2014.01) |
| H04N 19/176 | (2014.01) |
| H04N 19/154 | (2014.01) |
| H04N 19/17 | (2014.01) |
| H04N 19/895 | (2014.01) |

(52) U.S. Cl.
CPC ............ *H04N 19/00* (2013.01); *H04N 19/154* (2014.11); *H04N 19/17* (2014.11); *H04N 19/176* (2014.11); *H04N 19/895* (2014.11)

(58) Field of Classification Search
CPC ..................................................... H04N 19/00
USPC ................................................... 375/240.27
See application file for complete search history.

(56) References Cited

U.S. PATENT DOCUMENTS

| 6,697,290 | B2 | 2/2004 | Koss et al. | |
|---|---|---|---|---|
| 7,012,963 | B2 | 3/2006 | Zdepski et al. | |
| 2004/0210802 | A1 | 10/2004 | Oppold et al. | |
| 2006/0013320 | A1* | 1/2006 | Oguz et al. | ............... 375/240.27 |

FOREIGN PATENT DOCUMENTS

| JP | 2006506909 | 2/2006 |
|---|---|---|
| WO | WO2007126517 | 11/2007 |

OTHER PUBLICATIONS

"An Error Sensitivity-based Redundant Macroblock Strategy for Robust Wireless Video Transmission"; Jie Li and King Ngi Ngan; Jun. 13-16, 2005, IEEE.*

(Continued)

*Primary Examiner* — Mohammad L Rahman
(74) *Attorney, Agent, or Firm* — Robert D. Shedd; Vincent E. Duffy; Gregory Weaver (57) ABSTRACT

A method and apparatus are provided for redundant video coding. The apparatus includes an encoder for encoding a redundant coded picture corresponding to a source picture by selecting individual blocks in the source picture for inclusion into the redundant coded picture.

10 Claims, 4 Drawing Sheets

(56) References Cited

OTHER PUBLICATIONS

Zhu et al., "Coding of Redundant Pictures for Improved Error Resilience," Joint Video Team (JVT) of ISO/IEC MPEG & ITU-T VCEG (ISO/IEC JTC1/SC29/WG11 and ITU-T SG16 Q.6), 18th Meeting: Bangkok, Thailand, Jan. 14-20, 2006, JVT-R058, pp. 1-9.

Wang et al., "Error Control and Concealment for Video Communication: A Review," Proceedings of the IEEE, vol. 86, No. 5, May 1998, pp. 974-997.

Wenger, "H.264/AVC Over IP," IEEE Transactions on Circuits and Systems for Video Technology, vol. 13, No. 7, Jul. 2003, pp. 645-656.

"Video Robustness by Means of Redundant Slices," ST Microelectronics, Italian National Research Center, Feb. 13-17, 2006, Tdoc S4 (06)0015.

Baccichet et al., "Error resilience by means of coarsely quantized redundant descriptions," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, pp. 1-12, JVT-S046.

Bandyopadhyay et al., "Frame Loss Error Concealment for H.264/AVC," Joint Video Team (JVT) of ISO/IEC MPEG & ITU-T VCEG (ISO/IEC JTC1/SC29/WG11 and ITUT SG16 Q.6), 16th Meeting: Poznan, PL, Jul. 24-29, 2005, JVT-P072.

Dhondt et al., "Flexible macroblock ordering as a content adaptation tool in H.264/AVC," Multimedia Systems and Applications VIII, SPIE vol. 6015, (2005), XP007901849.

Huang et al., "An Adaptive Hybrid Mode Decision Scheme for H.264/AVC Video," PCM 2004, LNCS 3332, pp. 947-956, 2004.

Jung et al., "Selective Temporal Error Concealment Algorithm for H.264/AVC," 2004 IEEE International Conference on Multimedia and Expo (ICME), pp. 411-414.

Kang et al., "A Hybrid Error Concealment Scheme for MPEG-2 Video Transmission Based on Best Neighborhood Matching Algorithm," 2004 IEEE International Conference on Multimedia and Expo (ICME), pp. 1355-1358.

Kang et al., "An error resilient coding scheme for H.264/AVC video transmission based on data embedding," Elsevier Inc., 2005, pp. 93-114.

Kim et al., "Hybrid Error Concealment Method for H.264/AVC," Mobile A/V Research Team, ETRI, pp. 408-411, 2005.

Li et al., "An Error Sensitivity-based Redundant Macroblock Strategy for Robust Wireless Video Transmission," 2005 International Conference on Wireless Networks, Communications and Mobile Computing, pp. 1118-1123.

Mao et al., "An Error Resilience Scheme for Packet Loss REcover of H.264 Video," PCM 2004, LNCS 3332, pp. 975-984, 2004.

Nasiopoulos et al., "An Improved Error Concealment Algorithm for Intra-frames in H.264/AVC," IEEE 2005, pp. 320-323.

Quacchio et al., "Enhancing Whole-Frame Error Concealment with an Intra Motion Vector Estimator in H.264/AVC," IEEE 2005, pp. II-329-II-332.

Rane et al., "Systematic Lossy Error Protection based on H.264/AVC Redundant Slices and Flexible Macroblock Ordering," Joint Video Team (JVT) of ISO/IEC MPEG & ITU-T VCEG (ISO/IEC JTC1/SC29/WG11 and ITU-T SG16 Q.6), 19th Meeting: Geneva: Switzerland, Mar. 31-Apr. 7, 2006, JVT-S025, pp. 1-15.

Xiong et al., "Rate Control for Real-Time Video Network Transmission on End-to-End Rate-Distortion and Application-Oriented QoS," IEEE Transactions on Broadcasting, vol. 51, No. 1, Mar. 2005, pp. 122-132.

Search Report Mar. 19, 2008.

\* cited by examiner

METHOD AND APPARATUS FOR REDUNDANT VIDEO ENCODING

CROSS-REFERENCE TO RELATED APPLICATIONS

This application claims the benefit, under 35 U.S.C. §365 of International Application PCT/US2007/005115, filed Feb. 27, 2007 which was published in accordance with PCT Article 21(2) on Nov. 8, 2007 in English and which claims the benefit of U.S. provisional patent application No. 60/793,539 filed Apr. 20, 2006.

FIELD OF THE INVENTION

The present invention relates generally to video encoding and decoding and, more particularly, to a method and apparatus for redundant video coding.

BACKGROUND OF THE INVENTION

In video transmission networks, video data can often be missing upon delivery at the decoder end. This can be caused by various reasons such as, for example, network congestion, channel fading and interference, receiver buffer overflow, and so forth. To maintain a certain level of end user viewing experiences, error resilience is usually added in various ways to the bit streams by the encoder.

Redundant slice is a new tool introduced in the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard") to improve the video error robustness. Redundant slice provides a way to add source redundancy by a video encoder. With redundant slice coding, a redundant representation of a picture is coded, with possibly different coding parameters than the primary coded picture. At the decoder, when a primary slice is missing but its redundant slice is available, the decoder reconstructs the picture by decoding the redundant slice, and hence recovers part or all of the lost information.

The error resilience provided by redundant slice is at the expense of extra bit rate. An ineffective design of redundant slice coding can consume a significant amount of bit rate, while only providing limited capability of reducing video distortion.

The MPEG-4 AVC standard provides syntax for coding of redundant slices, but does not specify what type of information should be included in the coded redundant slice. There is no specified normative behavior in the MPEG-4 AVC standard for encoding or decoding redundant slices.

A feature of various methods for implementing redundant slice is that not all the bits spent on a redundant slice are effective in reducing delivered video distortion. Some information coded into the redundant slices by the methods can be readily obtained from other parts of the end-to-end system. This causes a waste of bit rate and hence results in a decreased coding efficiency.

SUMMARY OF THE INVENTION

These and other drawbacks and disadvantages of the prior art are addressed by the present invention, which is directed to a method and apparatus for redundant video coding.

According to an aspect of the present principles, there is provided an apparatus. The apparatus includes an encoder for encoding a redundant coded picture corresponding to a source picture by selecting individual blocks in the source picture for inclusion into the redundant coded picture.

According to another aspect of the present principles, there is provided a method. The method includes encoding a redundant coded picture corresponding to a source picture by selecting individual blocks in the source picture for inclusion into the redundant coded picture.

According to yet another aspect of the present principles, there is provided an apparatus. The apparatus includes a decoder for decoding a redundant coded picture when a primary picture corresponding to the redundant coded picture is unavailable, by forming a concealed picture based on at least one previously coded primary picture and a redundant decoded picture based on the redundant coded picture and combining the concealed picture and the redundant decoded picture to form a reconstructed picture.

According to still another aspect of the present principles, there is provided a method. The method includes decoding a redundant coded picture when a primary picture corresponding to the redundant coded picture is unavailable, by forming a concealed picture based on at least one previously coded primary picture and a redundant decoded picture based on the redundant coded picture and combining the concealed picture and the redundant decoded picture to form a reconstructed picture.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed to a method and apparatus for redundant video coding.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Figure 1:
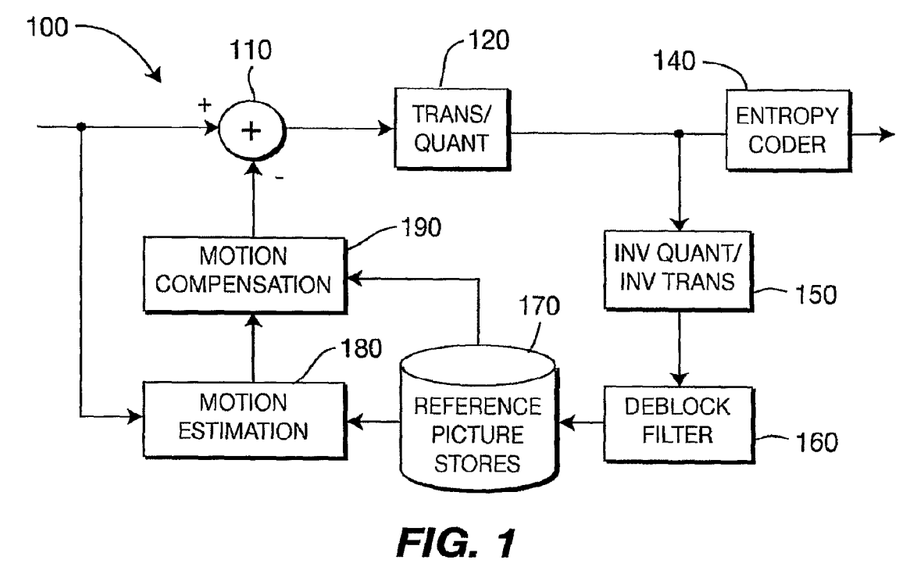
FIG. 1 shows a block diagram for an exemplary video encoder to which the present principles may be applied, in accordance with an embodiment of the present principles.

Turning to FIG. 1, an exemplary video encoder to which the present principles may be applied is indicated generally by the reference numeral 100.

An input to the video encoder 100 is connected in signal communication with a non-inverting input of a combiner 110. The output of the combiner 110 is connected in signal communication with a transformer/quantizer 120. The output of the transformer/quantizer 120 is connected in signal communication with an entropy coder 140. An output of the entropy coder 140 is available as an output of the encoder 100.

The output of the transformer/quantizer 120 is further connected in signal communication with an inverse transformer/quantizer 150. An output of the inverse transformer/quantizer 150 is connected in signal communication with an input of a deblock filter 160. An output of the deblock filter 160 is connected in signal communication with reference picture stores 170. A first output of the reference picture stores 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture stores 170 is connected in signal communication with a second input of the motion compensator 190. The output of the motion compensator 190 is connected in signal communication with an inverting input of the combiner 110.

Figure 2:
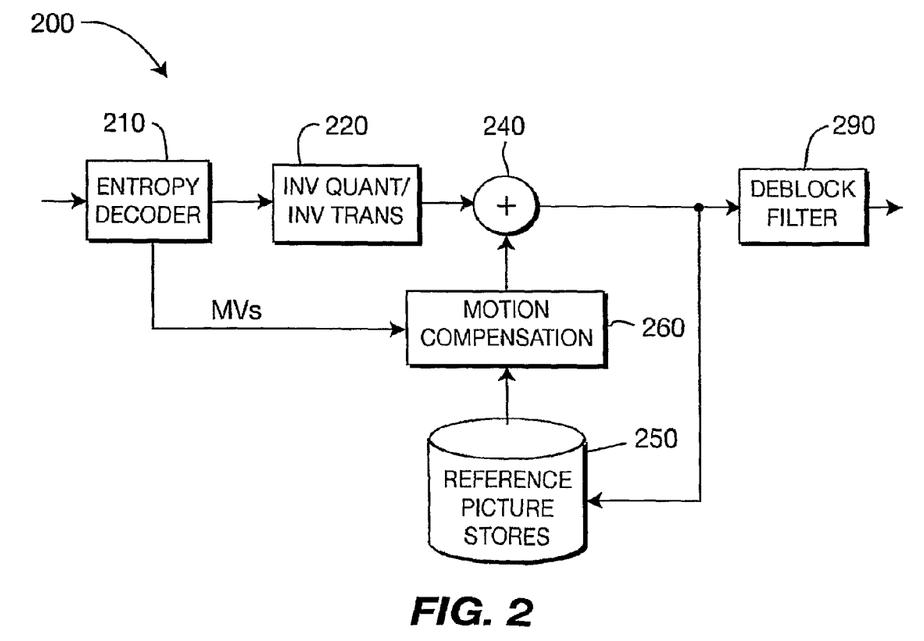
FIG. 2 shows a block diagram for an exemplary video decoder to which the present principles may be applied, in accordance with an embodiment of the present principles.

Turning to FIG. 2, an exemplary video decoder to which the present principles may be applied is indicated generally by the reference numeral 200.

The video decoder 200 includes an entropy decoder 210 for receiving a video sequence. A first output of the entropy decoder 210 is connected in signal communication with an input of an inverse quantizer/transformer 220. An output of the inverse quantizer/transformer 220 is connected in signal communication with a first non-inverting input of a combiner 240.

The output of the combiner 240 is connected in signal communication with an input of a deblock filter 290. An output of the deblock filter 290 is connected in signal communication with an input of a reference picture stores 250. The output of the reference picture stores 250 is connected in signal communication with a first input of a motion compensator 260. An output of the motion compensator 260 is connected in signal communication with a second non-inverting input of the combiner 240. A second output of the entropy decoder 210 is connected in signal communication with a second input of the motion compensator 260. The output of the deblock filter 290 is available as an output of the video decoder 200.

The present principles are directed to a method and apparatus for redundant video coding. When a redundant slice is coded at the encoder, the information that can be recovered by the decoder error concealment for its primary coded picture is considered. This information is used by the encoder to effectively reduce the content necessary to be coded in the redundant coded picture, thus resulting in a potential bit rate savings without sacrificing performance. A corresponding signaling method is described such that the encoder can efficiently inform the decoder about the different handling of decoded areas when using a redundant slice to reconstruct an original frame.

While primarily described herein with respect to the MPEG-4 AVC standard, it is to be appreciated that, given the teachings of the present principles provided herein, the present principles are not limited to solely the MPEG-4 AVC standard and, thus, may be implemented with respect to other video coding standards and recommendations, while maintaining the scope of the present principles.

In an embodiment, an encoder codes a redundant slice for a given frame by selecting whether individual blocks in the given frame should be included in the coding region for the redundant slice. The encoder may include a module having a decoder's error concealment algorithm, which is used by the decoder if a primary picture for the given frame were lost. The encoder may use the module to select which individual blocks of the given frame are to be included in the coding region for the redundant slice. A SKIP mode may be used to indicate that a block is not coded in the redundant slice, and the encoder may be modified to guarantee that the SKIP mode is not used for blocks that are included in the coding region of the redundant coded slice. An absolute-difference distortion measure may be used to determine whether a block is included in the coding region. The absolute-difference distortion measure may be based on the difference between (1) the result of the error concealment algorithm and (2) an expected result from the decoder if the primary picture were not lost. A value of the absolute-difference distortion measure may be compared to a threshold to determine whether to select the block, and the block may be selected to be coded in the redundant coded picture (e.g., the redundant slice) if the result exceeds the threshold. The block may have a size of 16×16.

In an embodiment, a decoder is configured to decode redundant slices when the primary picture is not available at the decoder and the redundant coded picture is available. The decoder forms an error-concealed picture (a concealed picture) based on previously coded primary pictures, and forms a redundant decoded picture from the redundant slice, and combines these two pictures. A SKIP mode may be used for a block to indicate that the concealed picture should be used, and not SKIP mode for the redundant slice. The error concealment method may be frame copy or motion copy. The block may have a size of 16×16.

As noted above, redundant slice is a new error resilience tool introduced in the MPEG-4 AVC standard. In the MPEG-4 AVC standard, a primary coded picture (PCP) is a coded picture representation that has normative effect on the decoding process. Contrarily, a redundant coded picture (RCP) includes a coded representation of a picture or a part of a picture without a normative effect on the decoding process. A redundant coded picture can be coded by means of a redundant slice. Therefore, when coding a redundant slice, the encoder has the flexibility to use totally different coding parameters other than those of the primary coded picture, such as different coding regions, quantization step sizes, and so forth. At the decoder, a redundant slice is only decoded when the primary slice cannot be correctly reconstructed (e.g., the primary slice is missing or corrupted), otherwise the redundant slice is discarded.

One issue that exists in the use of redundant slices is how to spend bits on a redundant slice efficiently, according to its characteristics, to improve delivered video error resilience. One goal may be to reduce the distortion of the delivered video presented to the end viewer, and this goal may be approached from an end-to-end system perspective.

Let $f_n$, $\tilde{f}_n$, $\hat{f}_n$ be the n-th original frame, the encoder-reconstructed frame and the decoder-reconstructed frame, in a video sequence, respectively. In a video transmission system, the total distortion $D_n$ of frame n perceived by the end viewer includes source-induced distortion $D_{s,n}$ and channel-induced distortion $D_{c,n}$ which are defined as follows:

$$D_n = D_{s,n} + D_{c,n}$$

$$D_{s,n} = E_a\{(f_n - \tilde{f}_n)^2\}$$

$$D_{c,n} = E\{(\tilde{f}_n - \hat{f}_n)^2\}$$

where $E_a\{\cdot\}$ denotes the averaging-over-pixel operation, and $E\{\cdot\}$ denotes the concatenation of expectation and averaging-over-pixel operation. According to its definition, a redundant slice does not affect the decoding of a primary slice, so the redundant slice cannot impact the source-induced distortion $D_{s,n}$. Therefore, we focus on utilizing redundant slice coding to lower the channel-induced distortion $D_{c,n}$.

At the video decoder, when a coded video picture is detected missing or corrupted, it is common to invoke some error concealment operation E.C.$\{\cdot\}$ to recover the information. Generally, E.C.$\{\cdot\}$ utilizes the correlation from spatial or temporal neighbors to reconstruct the damaged region. Consider a special case where a video sequence is coded in I P P P . . . with Baseline profile by an MPEG-4 AVC encoder and a redundant slice is to be coded for a P-type picture. Suppose frame n is missing at the decoder, and the decoder conceals frame n based on the previous available frame n−1, so that:

$$D_{c,n} = E\{(\tilde{f}_n - \hat{f}_n)^2\} = E\{(\tilde{f}_n - E.C.\{\hat{f}_{n-1}\})^2\}$$

Based on the above observation, minimizing the term $(\tilde{f}_n - E.C.\{\hat{f}_{n-1}\})$ can effectively reduce $D_{c,n}$ and hence $D_n$ as well.

Error concealment often plays an important role in recovering lost information at the decoder. In general, error concealment can conceal regions with little or slow-motion effectively, while it may produce artifacts for regions with active and chaotic motion. Nonetheless, except for some special cases such as scene change, a significant amount of information can be recovered by error concealment for a lost frame. Meanwhile, there exists some well-defined, widely used error concealment algorithms, such as frame-repeat and motion-copy algorithms.

To eliminate $D_{c,n}$ caused by the loss of frame n, most straightforwardly, its redundant coded picture should include a duplicate of the frame. However, from the end-to-end system perspective, the decoder is expected to recover part of the lost information by error concealment. Therefore, if the encoder knows how the decoder conceals the lost frame, then the recoverable information can be excluded from the redundant slice coding at the encoder without any impact on reducing the distortion. Also, at the decoder, the missing part of the information can be obtained by error concealment.

Presume the encoder is able to perform the error concealment operation that the decoder performs to conceal a lost frame. Define the residual-distortion frame $\bar{f}_n$ for frame n as follows:

$$\bar{f}_n = \tilde{f}_n - \hat{f}_n = E.C.\{\tilde{f}_{n-1}\} - \tilde{f}_n$$

So $\bar{f}_n$ depicts the distortion image produced when the single frame n is lost and concealed by the error concealment operation. It is to be noted that if $\bar{f}_n$ is coded into a redundant slice and is available to the decoder, then according the above equation, frame n can be completely recovered even if its primary slice is lost. It is to be also noted that $\bar{f}_n$ is obtainable by the encoder after the encoder performs the encoding and the error concealment for frame n. Since the E.C.$\{\tilde{f}_{n-1}\}$ operation can reproduce much of the information for frame n, it can be expected that $\bar{f}_n$ includes less information than $f_n$ or $\tilde{f}_n$ and, thus, would cost the fewest bits if each of these frames were coded.

However, due to the predictive coding nature of video compression, directly coding the residual frame is usually far less efficient than coding the original frame, in that temporal correlation cannot be utilized. To address this problem but with the goal of reducing $D_{c,n}$, the following approach is taken. After obtaining frame $\bar{f}_n$, the encoder checks which regions in $\bar{f}_n$ include significant distortion. After identifying all such regions in $\bar{f}_n$, the encoder selects the corresponding ones in the original frame $f_n$ and copies them into the redundant slice to code. Since the encoder codes the areas directly from the original frame, the main coding gain from predictive coding is preserved. Meanwhile, since only selected regions from the original frame are coded in the redundant slice, less bit rate cost can be achieved.

The procedure of selecting distortion regions is carried out on a block by block basis. Presume PAD (pixel absolute difference) is the distortion measure. Of course, it is to be appreciated that the use of pixel absolute difference is for illustrative purposes and, thus, other distortion measures may also be utilized in accordance with the teachings of the present principles, while maintaining the scope of the present principles. Suppose each block is of size L×L in pixels. Define $Th_1$ as the threshold of the pixel absolute difference and a pixel in $\tilde{I}_n$ is regarded as distorted whenever its pixel absolute difference value is above $Th_1$. Define $Th_2$ as the threshold of the number of pixels and a block is regarded as distorted whenever there are more than $Th_2$ pixels in the block that are regarded as distorted. An embodiment showing the selection procedure is shown and described with respect to FIG. 1. Notice that the thresholds $Th_1$ and $Th_2$ directly control the percentage of the original frame, or equivalently the amount of redundancy to be coded into the redundant slice. Lowering the thresholds includes more areas into the redundant slice, and vice versa. By including more areas from the original frame into the redundant slice, more areas of the decoded frame can be correctly reconstructed and, hence, it decreases the distortion of the frame and the associated error propagation, but at the expense of more bit rate.

In the above pixel absolute difference analysis, multiple components (e.g., RGB or YUV) may be summed. Alternatively, an absolute difference distortion measure may be used on a single component of a pixel such as, for example, luminance, and the pixel absolute difference value for the single component may be compared to a threshold. Further, in other implementations, a pixel absolute difference analysis may be performed on the entire block, summing the absolute differences for each pixel in the block, and comparing the sum to a threshold.

One advantage of the above approach is its simplicity. Distortion area selection is on a per block basis, so that existing data structures in the encoder can be utilized. To realize the described functionality, in an embodiment, only an error concealment module and very limited compare-and-copy operations need to be added to the encoder. Since there are many simple off-the-shelf error concealment algorithms, the extra complexity added to the encoder is limited. Once the areas to be coded in the redundant slice are determined, the encoder has the flexibility to choose appropriate parameters to code the slice. We choose to code with a coarser quantization step size. With this approach, the original frame represented by a redundant slice has a larger source distortion than the primary slice, but it also costs fewer bits to code. Compared to the distortion caused when a primary slice with no redundant slice is lost, the source distortion is generally much smaller and less noticeable by decoding the redundant slice. Another advantage of using a coarser quantization step size is that the redundant slice can typically be encoded by the normal encoding routine with only minor changes, which will be discussed hereinafter. Using other coding methods to code the redundant slice are also possible.

At the decoder, a frame can be reconstructed as follows when its primary slice is missing but its redundant slice is available. The decoder obtains a concealed frame by error concealment and a redundant coded picture by decoding the redundant slice. Then the decoder merges the two frames together to form the reconstructed frame. In merging the two frames, when a block area is identified as being coded in the redundant slice, the block area is copied from the corresponding location in the redundant coded picture. Otherwise, the block area is copied from the corresponding location in the concealed frame.

The 16×16 block size, which is a full MB (macroblock), can be used as the unit size for applying the threshold and determining which regions are to be coded in the redundant coded picture. Other smaller block sizes, or larger block sizes, may also be used.

With the described method, the encoder selects some macroblocks from the original frame to be coded into the redundant slice, and the decoder decodes these macroblocks and merges them with the concealed frame to reconstruct the original frame. Advantageously, the present principles allow for macroblocks that are not selected in the redundant slice to be represented with minimal overhead. Moreover, advantageously, the present principles allow for the decoder to be informed of whether or not a macroblock is selected when decoding a redundant slice. In an embodiment directed to keeping the overhead low and re-using most existing functions in the encoder/decoder, we redefine SKIP mode to serve as the signaling mechanism between the encoder and decoder when coding the redundant slices.

Specifically, when a redundant slice is encoded at the encoder, for those macroblocks that are not selected from the original frame, the encoder forces them to be coded in SKIP mode. Meanwhile, for those macroblocks that are copied from the original frame, the encoder disables the use of SKIP mode when they are coded. At the decoder, when a redundant slice is decoded, a 2-dimension array skip_mode_map is created, with each element recording whether a macroblock is coded in SKIP mode or not. Once the entire redundant slice is decoded, skip_mode_map is filled up. During the next step of merge, for each macroblock in the reconstructed frame, the decoder checks skip_mode_map to determine which frame to copy from, either from the concealed frame if the macroblock is coded in SKIP, or from the redundant coded picture otherwise.

With this approach, the existing encoding and decoding routines can be re-used for coding redundant slices, and it avoids the complexity of defining new syntax as a signaling mechanism. Furthermore, with this approach, those macroblocks not selected into the redundant slice can be efficiently coded because SKIP mode only takes very few bits to code. On the other hand, disabling SKIP mode for those selected macroblocks causes limited coding efficiency loss. This is due in part to the fact that, when the error concealment is effective, those macroblocks with excessive distortion are also unlikely to be coded in SKIP mode in regular coding. The encoder needs to be adjusted to ensure that SKIP mode is not selected when coding the macroblocks in the redundant coded picture.

It is to be appreciated that much of the above discussion focused on a single implementation for clarity purposes. However, it is to be further appreciated that, given the teachings of the present principles provided herein, other implementations are possible, for example, by varying one or more details of the above described embodiments and implementations, while maintaining the scope of the present principles. For example, although the method of redundant slice coding is described in the case of P reference pictures, it can be straightforwardly applied to other types of frames, such as I frames, B frames, and so forth. The method of redundant slice coding also may be applied, for example, to instantaneous decoding refresh (IDR) frames.

Further, the aspect of coding a portion of a given frame a second time may be applied generally to other video compression standards and communication systems, and is not restricted to only the MPEG-4 AVC standard. For example, other communication systems may provide a second coding for the portion of the given frame that cannot be replicated in a decoder upon loss of a first encoding of the given frame.

An embodiment may include a signaling mechanism, such as, for example, the use of the SKIP mode described above, or some other mechanism for indicating which regions in a given frame are encoded a second time and/or indicating how those regions are encoded. A signaling mechanism may use existing elements (for example, the SKIP mode) of a standard, such as, for example, the MPEG-4 AVC standard, or may define a new syntax. Whether the signaling mechanism uses an existing element or defines a new syntax, the resulting bit stream sent from, for example, the encoder to the decoder may be formed in accordance with a signal format indicating which regions in a given frame are encoded a second time and/or indicating how those regions are encoded.

Given the teachings of the present principles provided herein, these and other variations and implementations and signaling methods of the present principles, as well as other standards/recommendations and communication systems to which the present principles may be applied, are readily determined by one of ordinary skill in this and related arts, while maintaining the scope of the present principles.

Figure 3:
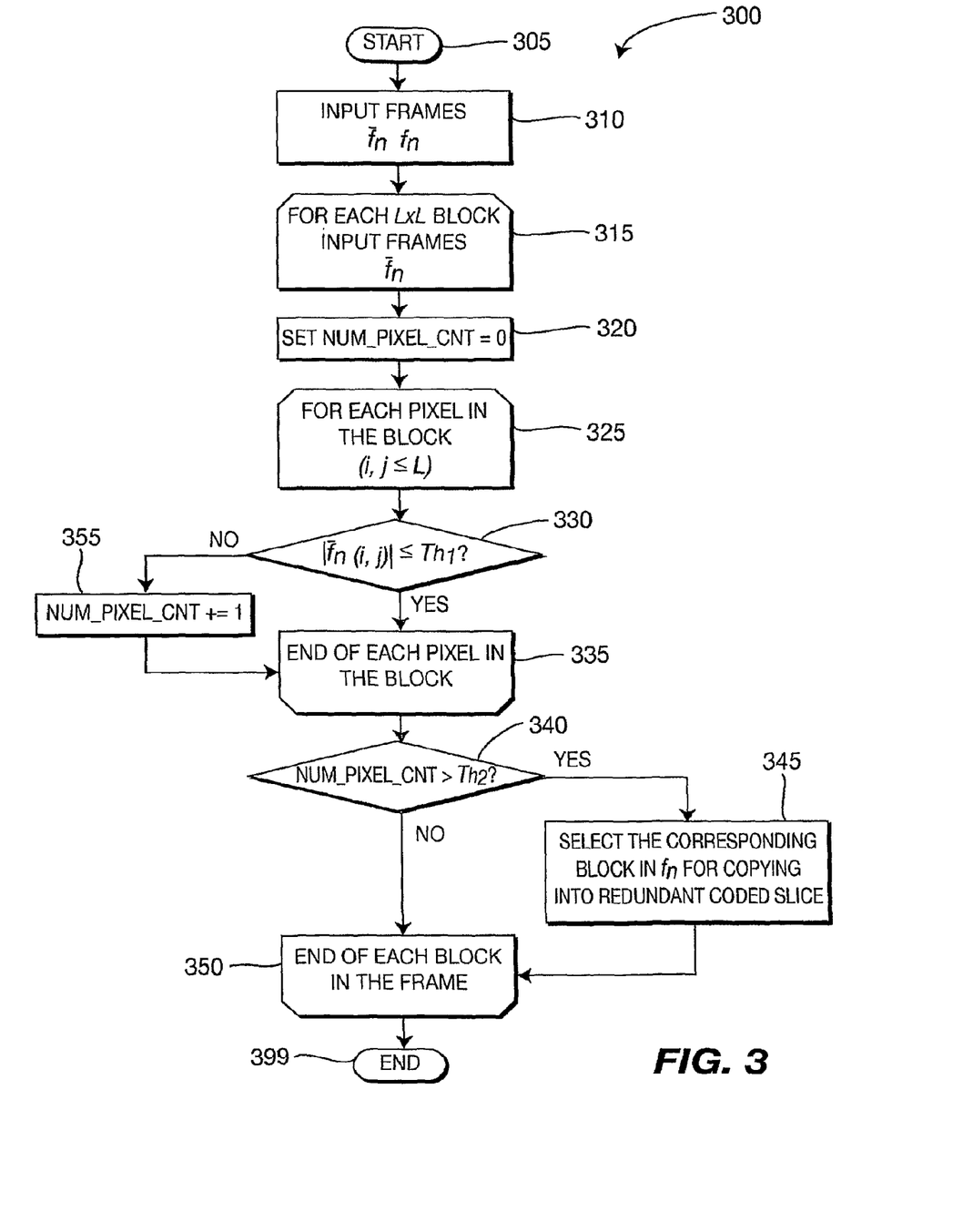
FIG. 3 shows a flow diagram for an exemplary method for selecting blocks for including in a redundant coded frame, in accordance with an embodiment of the present principles.

Turning to FIG. 3, an exemplary method for selecting blocks for including in a redundant coded frame is indicated generally by the reference numeral 300.

The method 300 includes a start block 305 that passes control to a function block 310. The function block 310 inputs frames $f_n$ and $\tilde{f}_n$, and passes control to a loop limit block 315. The loop limit block 315 begins a loop for each L×L block in frame $\tilde{f}_n$, and passes control to a function block 320. The function block 320 sets num_pixel_cnt equal to zero, and passes control to a loop limit block 325. The loop limit block 325 begins a loop for each pixel in the block (i, j<=L), and passes control to a decision block 330. The loop limit block 330 determines whether or not $|\tilde{f}_n(i,j)| \le Th_1$. If so, then control is passed to a loop limit block 335. Otherwise, control is passed to a function block 355.

The loop limit block 335 ends the loop over each pixel in the block, and passes control to a decision block 340. The decision block 340 determines whether or not num_pixel_cnt>$Th_2$. If so, then control is passed to a function block 345. Otherwise, control is passed to a function block 350.

The function block 345 selects the corresponding block in $f_n$ for copying into the redundant coded picture (RCP), and passes control to a loop limit block 350. The loop limit block 350 ends the loop over each block in the frame, and passes control to an end block 399.

The function block 355 increments num_pixel_cnt by one, and passes control to the loop limit block 335.

Figure 4:
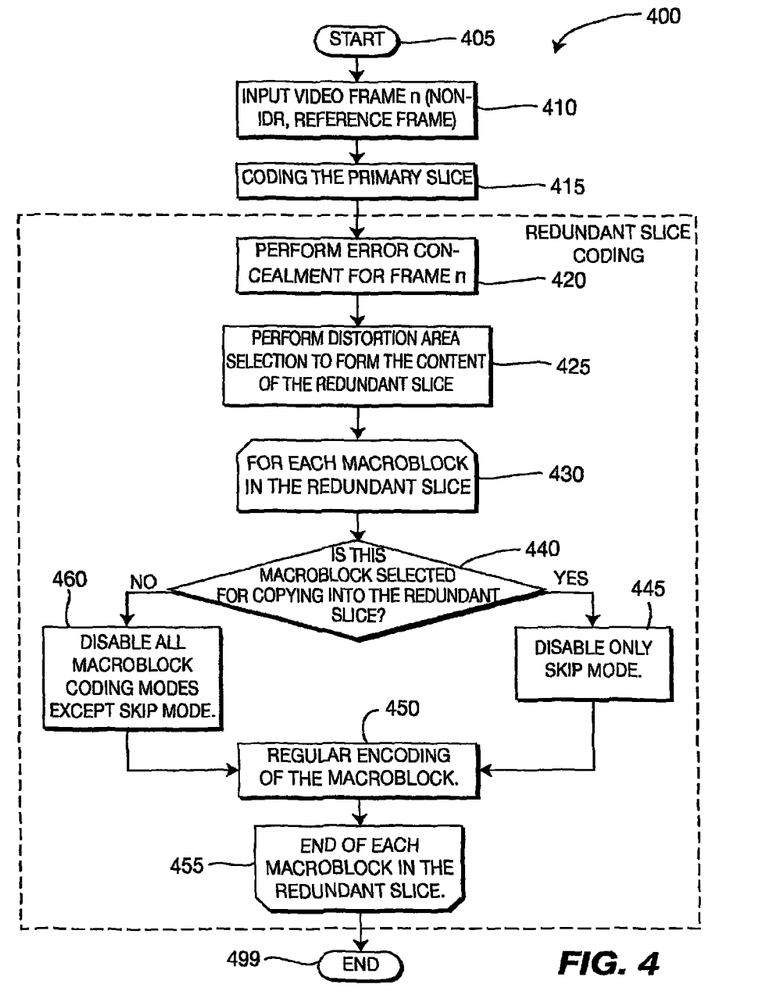
FIG. 4 shows a flow diagram for an exemplary method for encoding a frame with a redundant slice, in accordance with an embodiment of the present principles.

Turning to FIG. 4, an exemplary method for encoding a frame with a redundant slice is indicated generally by the reference numeral 400.

The method 400 includes a start block 405 that passes control to a function block 410. The function block 410 inputs video frame n (non-IDR, reference frame), and passes control to a function block 415. The function block 415 codes the primary slice, and passes control to a function block 420. The function block 420 performs error concealment for frame n, and passes control to a function block 425. The function block 425 performs distortion area selection to form the content of the redundant slice, and passes control to a loop limit block 430. The loop limit block 430 begins a loop for each macroblock in the redundant slice, and passes control to a decision block 440. The decision block 440 determines whether or not this macroblock is selected for copying into the redundant slice. If so, then control is passed to a function block 445. Otherwise, control is passed to a function block 460.

The function block 445 disables only SKIP mode, and passes control to a function block 450. The function block 450 performs regular encoding of the macroblock, and passes control to a loop limit block 455. The loop limit block 455 ends the loop for each macroblock in the redundant slice, and passes control to an end block 499.

The function block 460 disables all macroblock coding modes except SKIP mode, and passes control to the function block 450.

Figure 5:
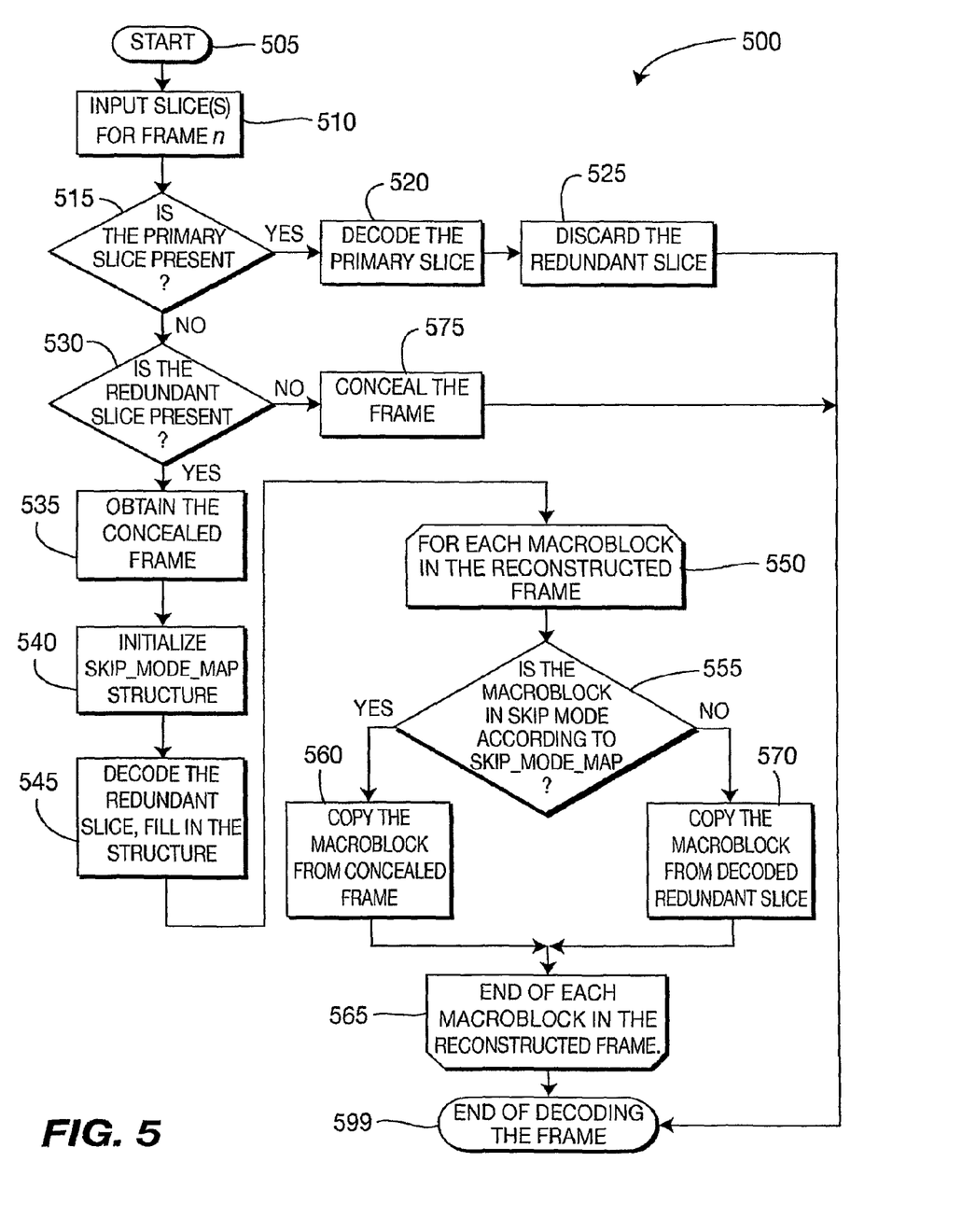
FIG. 5 shows a flow diagram for an exemplary method for decoding a frame with a redundant slice, in accordance with an embodiment of the present principles.

Turning to FIG. 5, an exemplary method for decoding a frame with a redundant slice is indicated generally by the reference numeral 500.

The method 500 includes a start block 505 that passes control to a function block 510. The function block 510 inputs a slice(s) for frame n, and passes control to a decision block 515. The decision block 515 determines whether or not the primary slice is present. If so, then control is passed to a function block 520. Otherwise, control is passed to a decision block 530.

The function block 520 decodes the primary slice, and passes control to a function block 525. The function block 525 discards the redundant slice, and passes control to an end block 599. The end block 599 ends the decoding of the frame.

The decision block 530 determines whether or not the redundant slice is present. If so, the control is passed to a function block 535. Otherwise, control is passed to a function block 575.

The function block 535 obtains the concealed frame, and passes control to a function block 540. The function block 540 initializes the skip_mode_map structure, and passes control to a function block 545. The function block 545 decodes the redundant slice, fills in the slip_mode_map structure, and passes control to a loop limit block 550. The loop limit block 550 begins a loop over each macroblock in the reconstructed frame, and passes control to a decision block 555. The decision block 555 determines whether or not the macroblock is in SKIP mode according to skip_mode_map. If so, then control is passed to a function block 560. Otherwise, control is passed to a function block 570.

The function block 560 copies the macroblock from the concealed frame, and passes control to a loop limit block 565. The loop limit block 565 ends the loop for each macroblock in the reconstructed frame, and passes control to an end block 599. The end block 599 ends the decoding of the frame.

The function block 575 conceals the frame, and passes control to the end block 599.

The function block 570 copies the macroblock from the decoded redundant slice, and passes control to the loop limit block 565.

A description will now be given of some of the many attendant advantages/features of the present invention, some of which have been mentioned above. For example, one advantage/feature is an apparatus having an encoder for encoding a redundant coded picture corresponding to a source picture by selecting individual blocks in the source picture for inclusion into the redundant coded picture. Another advantage/feature is the apparatus having the encoder as described above, wherein the encoder selects the individual blocks using a decoder error concealment operation that considers when a primary picture corresponding to the redundant coded picture is unavailable at a decoder. Yet another advantage/feature is the apparatus having the encoder as described above, wherein the encoder uses SKIP mode to indicate that a particular one of the individual blocks is not coded in the redundant coded picture. Still another advantage/feature is the apparatus having the encoder as described above, wherein the encoder is configured to ensure that the SKIP mode is prohibited from use for any of the individual blocks coded in the redundant coded picture. Moreover, another advantage/feature is the apparatus having the encoder as described above, wherein the encoder selects the individual blocks based on a distortion measure. Further, another advantage/feature is the apparatus having the encoder that selects the individual blocks based on a distortion measure as described above, wherein the distortion measure is calculated using pixel absolute difference. Also, another advantage/feature is the apparatus having the encoder as described above, wherein the encoder selects the individual blocks by respectively classifying each of pixels in a distortion image as distorted when a respective distortion measure between a particular one of the pixels in the distortion image and a corresponding pixel in the source image is greater than a first threshold and respectively selecting any of the individual blocks having a respective number of distorted pixels greater than a second threshold. Additionally, another advantage/feature is the apparatus having the encoder that selects the individual blocks using the pixel classification and the first threshold as described above, wherein the distortion image represents a difference between an encoder-reconstructed picture and a decoder reconstructed image formed using a decoder error concealment operation. Moreover, another advantage/feature is the apparatus having the encoder that selects the individual blocks using the pixel classification and the first threshold as described above, wherein the distortion image is calculated using a decoder concealment operation applied to an encoder-reconstructed picture corresponding to the source picture and another encoder-reconstructed picture corresponding to another source picture immediately preceding the source image. Further, another advantage/feature is the apparatus having the encoder that selects the individual blocks using the pixel classification and the first threshold as described above, wherein any of the individual blocks having the respective number of distorted pixels greater than the second threshold are classified as distorted. Also, another advantage/feature is the apparatus having the encoder as described above, wherein each of the individual blocks have a block size of 16×16.

The details of one or more implementations are set forth in this disclosure. However, other features will be apparent from the disclosure. The various aspects, implementations, and features in this disclosure may be implemented in one or more of a variety of manners, even if described above using only one manner. For example, the various aspects, implementations, and features may be implemented using, for example, one or more of a method, an apparatus, an apparatus for performing a method, a program or other set of instructions, an apparatus that includes a program or a set of instructions, and a computer readable medium. The computer readable medium may include, for example, instructions, software, images, and other data.

As suggested above, implementations may include one or more devices configured to perform one or more processes. A device may include, for example, discrete or integrated hardware, firmware, and software. Such a device may include, for example, a processor, which refers to processing devices in general, including, for example, a microprocessor, an integrated circuit, or a programmable logic device. One implementation includes, therefore, an encoder and a decoder running software for implementing one or more of the described algorithms.

A device also may include one or more computer readable media having instructions for carrying out one or more processes. The computer readable medium may include, for example, a storage device such as, for example, a hard disk, a compact diskette, a random access memory ("RAM"), or a read-only memory ("ROM"). A computer readable medium also may include, for example, formatted electromagnetic waves encoding or transmitting instructions. Instructions may be, for example, in hardware, firmware, software, or in an electromagnetic wave. Instructions may be found in, for example, an operating system, a separate application, or a combination of the two. A processor may be characterized, therefore, as, for example, both a device configured to carry out a process and a device including computer readable media having instructions for carrying out a process.

Additionally, it will be understood that various modifications may be made. For example, elements of different implementations may be combined, supplemented, modified, or removed to produce other implementations. Accordingly, other implementations are within the scope of the present principles.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus comprising:
   an encoder for encoding a redundant coded picture corresponding to a source picture by selecting individual blocks in the source picture for inclusion into the redundant coded picture, wherein said encoder is configured to ensure that a SKIP mode is prohibited from use for any of the individual blocks coded in the redundant coded picture.

2. An apparatus comprising:
an encoder for encoding a redundant coded picture corresponding to a source picture by selecting individual blocks in the source picture for inclusion into the redundant coded picture, wherein said encoder selects the individual blocks by respectively classifying each of pixels in a distortion image as distorted when a respective distortion measure between a particular one of the pixels in the distortion image and a corresponding pixel in the source image is greater than a first threshold and respectively selecting any of the individual blocks having a respective number of distorted pixels greater than a second threshold.

3. The apparatus of claim 2, wherein the distortion image represents a difference between an encoder-reconstructed picture and a decoder reconstructed image formed using a decoder error concealment operation.

4. The apparatus of claim 2, wherein the distortion image is calculated using a decoder concealment operation applied to an encoder-reconstructed picture corresponding to the source picture and another encoder-reconstructed picture corresponding to another source picture immediately preceding the source image.

5. The apparatus of claim 2, wherein any of the individual blocks having the respective number of distorted pixels greater than the second threshold are classified as distorted.

6. In a video encoder, a method comprising:
encoding a redundant coded picture corresponding to a source picture by selecting individual blocks in the source picture for inclusion into the redundant coded picture, wherein said encoding step is configured to ensure that a SKIP mode is prohibited from use for any of the individual blocks coded in the redundant coded picture.

7. In a video encoder, a method comprising:
encoding a redundant coded picture corresponding to a source picture by selecting individual blocks in the source picture for inclusion into the redundant coded picture, wherein said encoding selects the individual blocks by respectively classifying each of pixels in a distortion image as distorted when a respective distortion measure between a particular one of the pixels in the distortion image and a corresponding pixel in the source image is greater than a first threshold and respectively selecting any of the individual blocks having a respective number of distorted pixels greater than a second threshold.

8. The method of claim 7, wherein the distortion image represents a difference between an encoder-reconstructed picture and a decoder reconstructed image formed using a decoder error concealment operation.

9. The method of claim 7, wherein the distortion image is calculated using a decoder concealment operation applied to an encoder-reconstructed picture corresponding to the source picture and another encoder-reconstructed picture corresponding to another source picture immediately preceding the source image.

10. The method of claim 7, wherein any of the individual blocks having the respective number of distorted pixels greater than the second threshold are classified as distorted.

\* \* \* \* \*